United States Patent

Romano

[11] Patent Number: 5,305,776
[45] Date of Patent: Apr. 26, 1994

[54] EMERGENCY SHUT-OFF DEVICE

[76] Inventor: Rosa Romano, Via Dante, 7-I-22070 Veniano (Como), Italy

[21] Appl. No.: 934,613
[22] PCT Filed: Jan. 28, 1991
[86] PCT No.: PCT/EP91/00155
  § 371 Date: Sep. 8, 1992
  § 102(e) Date: Sep. 8, 1992
[87] PCT Pub. No.: WO91/12459
  PCT Pub. Date: Aug. 22, 1991

[30] Foreign Application Priority Data
Feb. 6, 1990 [IT] Italy .................. 67086 A/90

[51] Int. Cl.⁵ ............................................. F16K 17/40
[52] U.S. Cl. ................................. 137/68.1; 137/614.02
[58] Field of Search ................ 137/68.1, 797, 614.02, 137/614.01, 637.05, 637.1, 614, 69; 251/304, 305

[56] References Cited

U.S. PATENT DOCUMENTS

| | | | |
|---|---|---|---|
| 4,295,484 | 10/1981 | Meisenheimer, Jr. | 137/315 X |
| 4,361,165 | 11/1982 | Flory | 137/614.02 X |
| 4,625,746 | 12/1986 | Calvin et al. | 137/68.1 |
| 4,643,216 | 2/1987 | Allread et al. | 137/68.1 |
| 4,667,883 | 5/1987 | Fink, Jr. | 137/68.1 X |
| 4,828,183 | 5/1989 | Fink, Jr. | 137/69 X |

Primary Examiner—Martin P. Schwadron
Assistant Examiner—Kevin L. Lee
Attorney, Agent, or Firm—Sughrue, Mion, Zinn, Macpeak & Seas

[57] ABSTRACT

An emergency shut-off device for use in the event of the breakage of pipes (2) for conveying fluids includes two adjacent valves (4) arranged in series in the pipe (2) wherein each valve (4) includes a hollow body (8) having a joint (14,12) with a predetermined breaking load for joining it to the body (8) of the other valve (2) and connectors (12,18) for connecting it to the adjacent portion of pipe (2). An obturator (24) is rotatable in the body (8) so that it can assume a shut-off position transverse the pipe (2) and an open position substantially perpendicular to its shut-off position. The obturator (24) has an engagement device (40) for engaging the obturator (24) of the other valve (4) fixing the two obturators (24) in a contiguous arrangement in their open positions, which they assume normally, and releasing the obturators (24) so that they can assume their shut-off configurations when the valves (4) move apart because the joint has been subjected to loads equal to or greater than the breaking load.

2 Claims, 3 Drawing Sheets

EMERGENCY SHUT-OFF DEVICE

BACKGROUND OF THE INVENTION

The present invention relates to an emergency shut-off device for use in the event of the breakage of a pipe for conveying fluids, for example, oil and petroleum derivatives. The device is particularly applicable to pipes connecting ships to floating or underwater installations or to shore.

SUMMARY OF THE INVENTION

The object of the present invention is to provide a device which automatically seals the two portions formed when the axial tensile stress exerted on the pipe exceeds a predetermined threshold value and causes it to break at a point, preventing the fluid they contain from polluting the outside environment.

The subject of the present invention is a device of the type indicated, characterised in that it comprises two adjacent valves arranged in series in the pipe and each comprising:

a hollow body having means with a predetermined breaking load for joining it to the body of the other valve and means for joining it to the adjacent portion of pipe, and an abturator which is rotatable in the body so that it can assume a shut-off position transverse the pipe and an open position substantially perpendicular to its shut-off position, the obturator having means for engaging the obturator of the other valve, the means fixing the two obturators in a contiguous arrangement in the open positions they assume normally and releasing the obturators so that they can assume their shut-off configurations when the valves move apart because their joining means have been subjected to loads greater than or equal to their breaking loads.

According to the invention, the means joining the two valves are the weakest point of the entire pipe and hence are intended to break under critical conditions. As will be described in detail below, the separation of the two valves causes their obturators to close and to isolate the two portions of pipe produced by the breakage from the outside environment.

The device according to the invention has the advantage that it is constituted by a small number of simple components and is therefore very reliable, which is a very important requirement for a device that must be guaranteed to operate correctly each time it is used.

BRIEF DESCRIPTION OF THE DRAWINGS

Further advantages and characteristics of the present invention will become clear from the detailed description which follows, with reference to the appended drawings, provided by way of non-limiting example, in which.

DETAILED DESCRIPTION OF THE INVENTION

Figure 1:
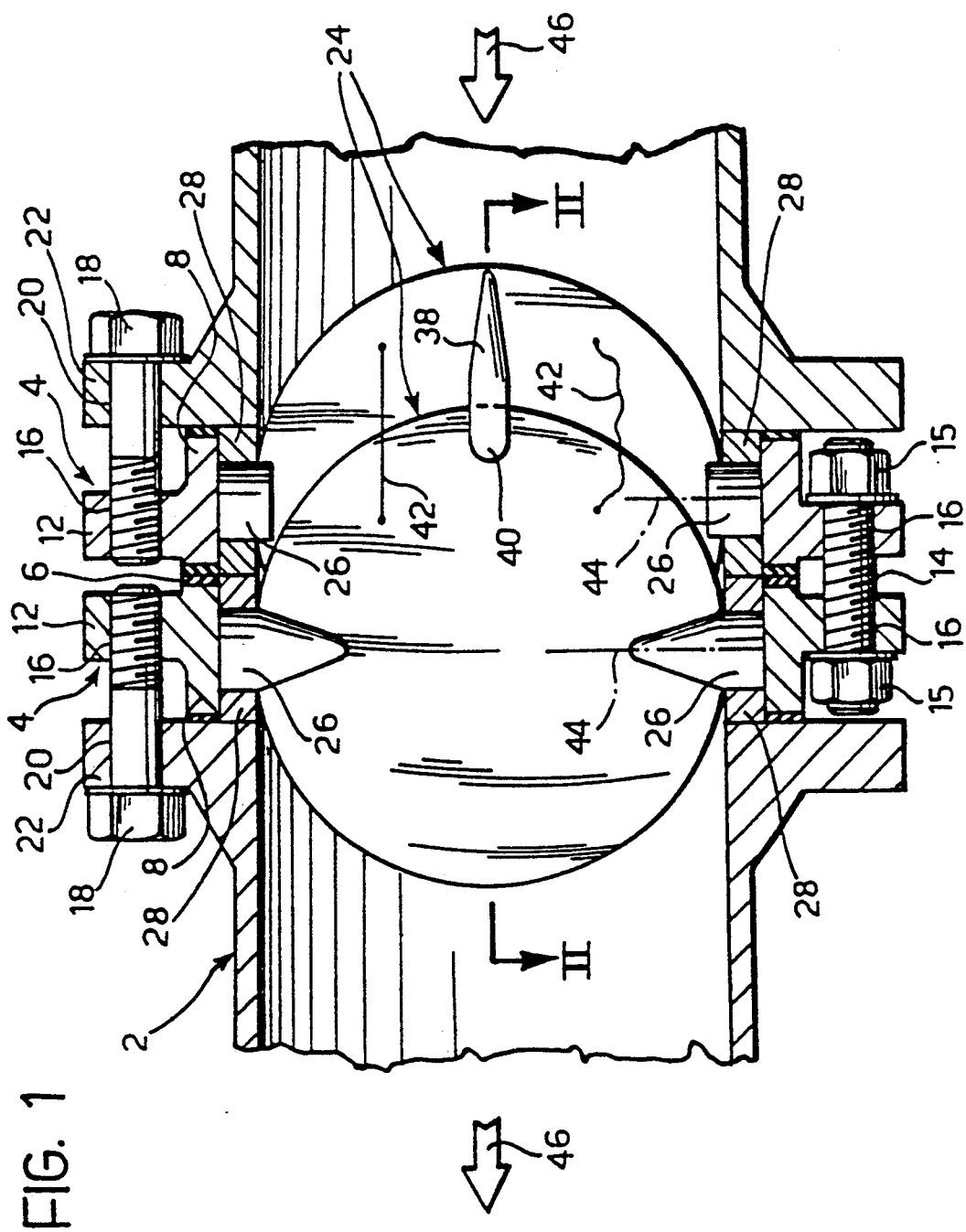
FIG. 1 is a sectional side view of a pipe with a shut-off device according to the invention.

With reference to the drawings, an emergency shut-off device is located in a pipe 2 for conveying petroleum derivatives, for example, from a ship to shore and comprises two adjacent valves 4 arranged in series with the interposition of a sealing ring 6. The valves 4 are butterly valves. In embodiments of the invention not illustrated, the valves may be of a different type, for example, ball valves. Each valve 4 includes a hollow body 8 with a sealing seat 10 to which a flange 12 is fixed. The flange has a ring of holes 16 for the passage of the bolts 14 with predetermined breaking loads which also pass through corresponding holes 16 of the flange 12 of the other valve 4 and are clamped by nuts 15, as well as for the engagement of screws 18 which also pass through respective holes 20 in a further flange 22 fixed to the portion of pipe adjacent each valve 2.

Each valve 4 has a disc-shaped obturator 24 with diametral pins 26 freely rotatable in recesses formed between the body 8 and blocks 28 fixed thereto by screws 30. Each obturator 24 has a shaped face 34 and its opposite face 36 has a flat portion which is intended to come into contact (FIG. 2) with the other obturator 24 in the open position, its remaining portion having a projection 38 which forms an extension of the profile of the other obturator 24 in the open position. Each projection 38 carries a stop protuberance 40 which engages the other obturator 24 to keep it in the open position under normal operating conditions but releases it when the two valves 4 move apart axially as a result of the breakage of the tie-bolts 14.

The obturators 24 are further interconnected by several wires 42 of different lengths, whose ends are connected to the obturators 24 in regions eccentric from their axes of rotation 44.

Figure 2:
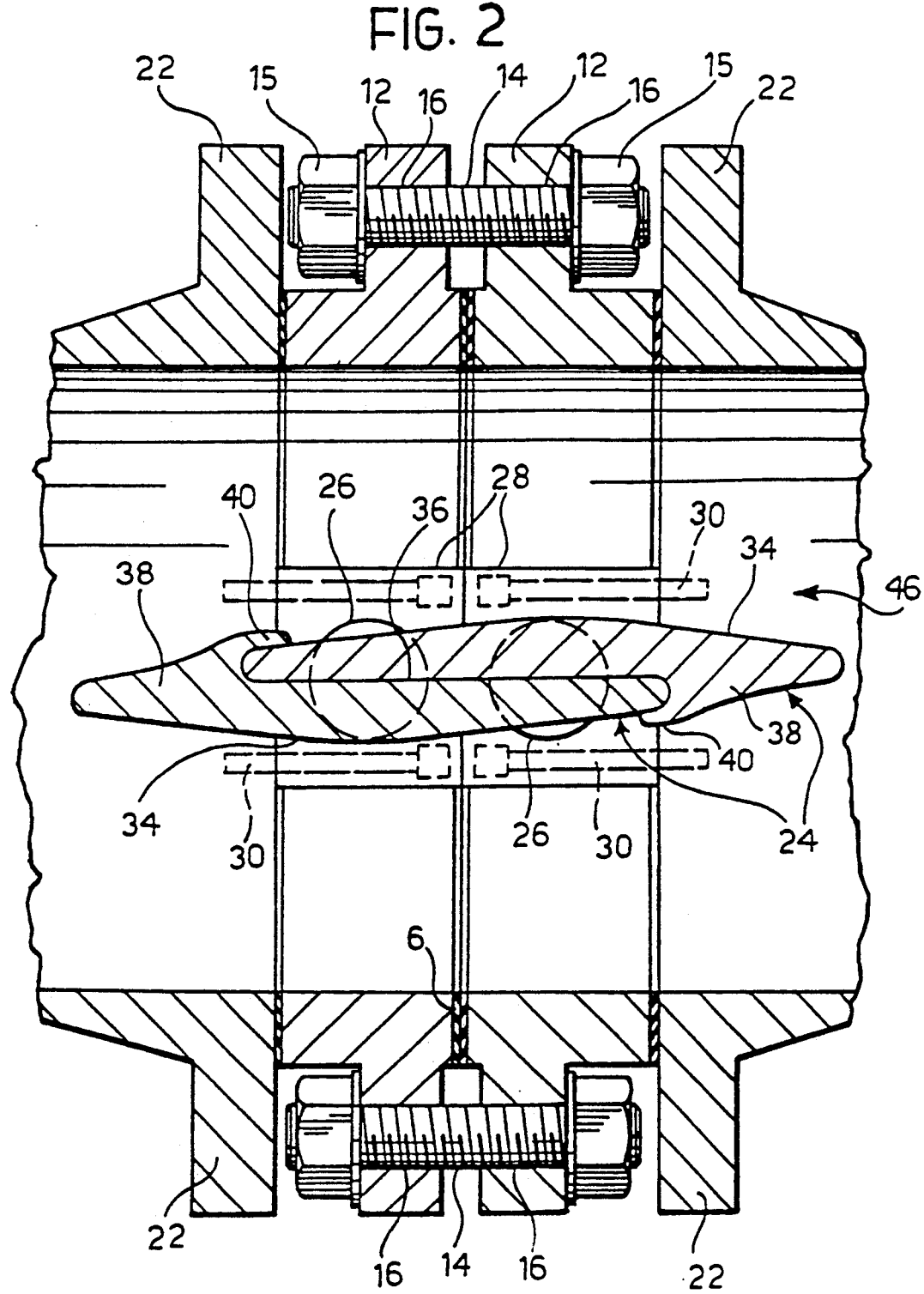
FIG. 2 is a section taken on the line II—II of FIG. 1.
Figure 3:
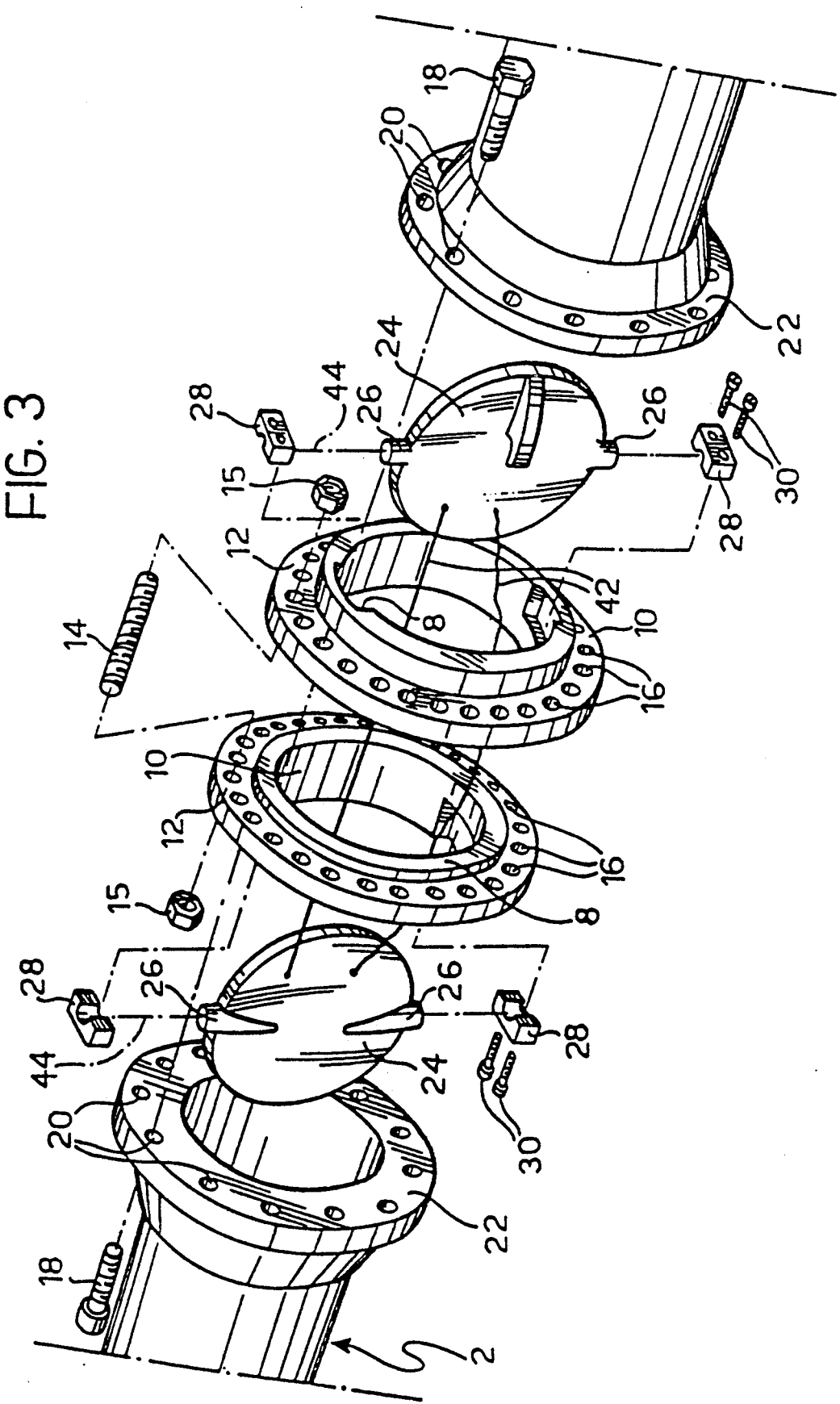
FIG. 3 is an exploded perspective view of the pipe.

In the normal operating conditions of the pipe, the obturators 24 of the two valves 4 are both in their open positions in which they overlap each other with their faces parallel to the flow of fluid (the direction of which is indicated by the arrows 46 in FIGS. 1 and 2). This position is maintained by the stop protuberances 40 which interconnect the obturators 24.

When, for some reason, the pipe 2 is subjected to an axial tensile stress greater than or equal to a predetermined threshold value, the tie-bolts 14 break since they are designed to be the weakest point of the entire pipe 2. Two portions of pipe 2 are thus formed with the valves 4 at their free ends. The valves 4 which are now disconnected move apart axially to release the two obturators 24 which only have to move a small distance axially to be released from their mutual engagement achieved by the stop protuberances 40. The fluid flowing over their surfaces causes the obturators 24 to pivot through 90° to their closed positions in which they are in stable equilibrium. The two portions of pipe 2 are thus sealed, preventing the fluid they contain from escaping to the outside environment.

The wires 42 constitute a further guarantee that the obturators 24 will close in the event of an emergency should the pressure exerted thereon by the fluid not succeed in closing them. In fact, when the ends of the two portions of pipe move apart by a distance corresponding to the length of one of the wires 42, the wire will be tensioned and, before it breaks, will cause the obturators 24 to pivot and thus close.

In an alternative embodiment of the invention, not shown, instead of the stop protuberances 40, each obturator 24 carries several T-shaped pegs on its face 36 which has the flat portion and these engage grooves formed in the facing surface of the other obturator 24. Each groove has a portion of T-shaped cross-section corresponding to that of the peg and an adjacent portion whose cross-section has straight sides so that the two obturators are interconnected as long as the pegs slide in the T-shaped portion of the groove as a result of the movement apart of the two valves 4 but are disconnected when the pegs enter the adjacent portions of the grooves.

In this embodiment, the obturators close more slowly and this may serve to absorb any fluid-hammer in the pipe.

In another embodiment of the invention, not shown, the axes of rotation 44 defined by the pins 26 of the obturators 24 are inclined to the vertical and the centres of gravity of the obturators 24 are eccentric from their axes of rotation 44. In this embodiment, there is a further guarantee that the shut-off device will close as a result of the moving apart of the two valves 4 since the obturators 24 are pulled towards their closure positions under their own weight.

In a further alternative embodiment of the invention, not shown, known ratchet mechanisms are associated with the pins 26 of the obturators 24 so that they can pivot in only one sense. This prevents an obturator 24 which has pivoted to the closed position as a result of the movement apart of the valves 4 from subsequently being forced to rotate in the opposite sense for some reason, re-opening the portion of pipe.

I claim:

1. An emergency shut-off device for use in the event of the breakage of pipes for conveying fluids, including two adjacent valves arranged in series in the pipe, each valve comprising:

a hollow body having joining means with a predetermined breaking load for joining said body to the body of the other valve and connecting means for connecting said body to the adjacent portion of pipe, and a disc-shaped obturator which is rotatable around an axis in the body so that said obturator can assume a shut-off position transverse the pipe and an open position substantially perpendicular to said shut-off position, the obturator having means for engaging the obturator of the other valve, the means fixing the two obturators in a contiguous arrangement in the open positions they assume normally and releasing the obturators so that they can assume said shut-off positions when the valves move apart because said joining means have been subjected to loads greater than or equal to said breaking loads, wherein the axes of the two obturators are separated by a distance shorter than the diameter of the obturators and in that each obturator has a not flat face and an opposite face with a flat portion, which is intended to substantially overlap the flat portion of the face of the other obturator, when the two valves are in the open position, the flow of the fluid over the faces of the obturators forcing the obturators to assume said shut-off positions when the two valves move apart due to the breaking of the joining means, wherein each obturator is rotatable in the body on diametral pins and has on the face with the flat portion a projection which, in the open position, forms an extension of the profile of the other obturator, and wherein the projection has a stop protuberance which engages the opposite obturator to keep it in the open position under normal operating conditions, but releases it when the valves move apart axially as a result of the breakage of the joining means.

2. A shut-off device according to claim 1, wherein the obturators are interconnected by at least one wire whose ends are connected to the obturators in regions eccentric from said axis of rotation of each obturator.

* * * * *